United States Patent [19]

Spengler et al.

[11] Patent Number: 5,076,880

[45] Date of Patent: Dec. 31, 1991

[54] APPARATUS FOR MANUFACTURING TRIM PANELS INCLUDING SEVERAL TRIM COMPONENTS

[75] Inventors: Gerhard Spengler, Frankfurt; Ernst Spengler, Heusenstamm by Ffm., both of Fed. Rep. of Germany

[73] Assignee: R + S Stanztechnik GmbH, Offenbach, Fed. Rep. of Germany

[21] Appl. No.: 476,967

[22] Filed: Feb. 7, 1990

Related U.S. Application Data

[62] Division of Ser. No. 245,777, Sep. 16, 1988, Pat. No. 4,923,539.

[51] Int. Cl.$^5$ .................. B32B 31/18; B32B 31/20
[52] U.S. Cl. .................. 156/382; 100/237; 156/228; 156/475; 156/510; 156/580; 156/581; 425/419
[58] Field of Search .................. 156/580, 581, 583.91, 156/228, 221, 306.6, 245, 214, 285, 382, 475, 510; 100/237, 264; 425/419, 504, 500, 519, 521, 520, 125, 388, 394; 264/510, 511, 275, 277, 278; 428/913.3, 542.2

[56] References Cited

U.S. PATENT DOCUMENTS

| | | | |
|---|---|---|---|
| 2,500,895 | 3/1950 | Davies | 425/394 X |
| 3,880,695 | 4/1975 | Standley et al. | 156/228 X |
| 4,470,786 | 9/1984 | Sano et al. | 425/125 |
| 4,690,666 | 9/1987 | Alexander | 425/394 X |
| 4,802,948 | 2/1989 | Zimmermann et al. | 156/581 X |
| 4,810,452 | 3/1989 | Taillefert et al. | 264/257 X |

Primary Examiner—Michael W. Ball
Assistant Examiner—Michele K. Yoder
Attorney, Agent, or Firm—W. G. Fasse; D. H. Kane, Jr.

[57] ABSTRACT

In a method of manufacturing trim panels which are made of several trim components or trim materials, such as door trim panels of automobiles, the trim panel is essentially finished in a single work operation in one work station. A vinyl cover film (12) is formed, trim inserts (10, 11) are laminated into the cover film with the aid of a nesting die (8a, 8b), soft-touch inserts (26) are laminated underneath the cover film and the so produced laminate is further laminated onto a rigid substrate (2 or 2'). The substrate may be a prefabricated substrate (2), or may be a rigid foam substrate (2') back-foamed onto the formed vinyl film (12). An apparatus for carrying out the method is essentially a forming station with an upper form or mold (1) and a lower form or mold (15). The lower mold (15) includes nest dies (8a, 8b) for securely holding and then pressure laminating the trim inserts (10, 11), whereby a high placement precision of the inserts (10, 11) is achieved. The present method and apparatus are simpler, faster, and less labor-intensive, and achieve better results than prior methods and apparatus in the art.

8 Claims, 7 Drawing Sheets

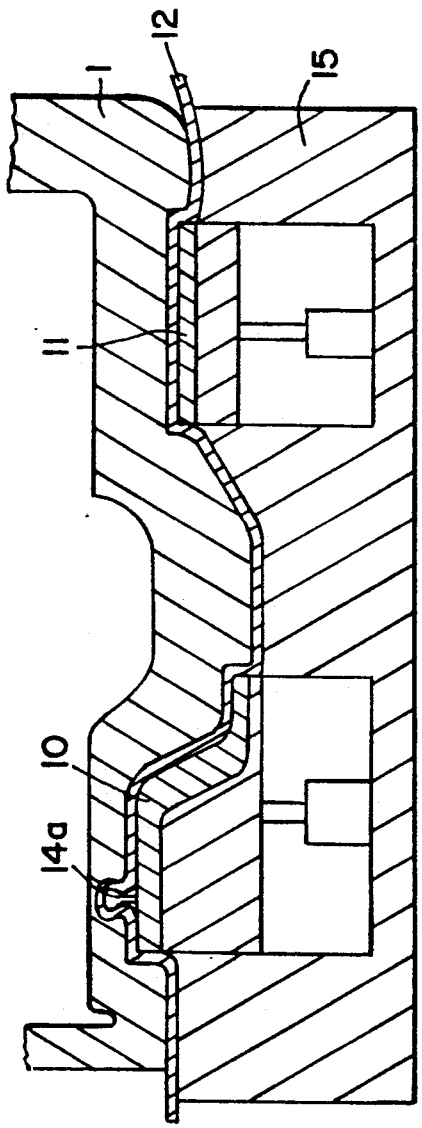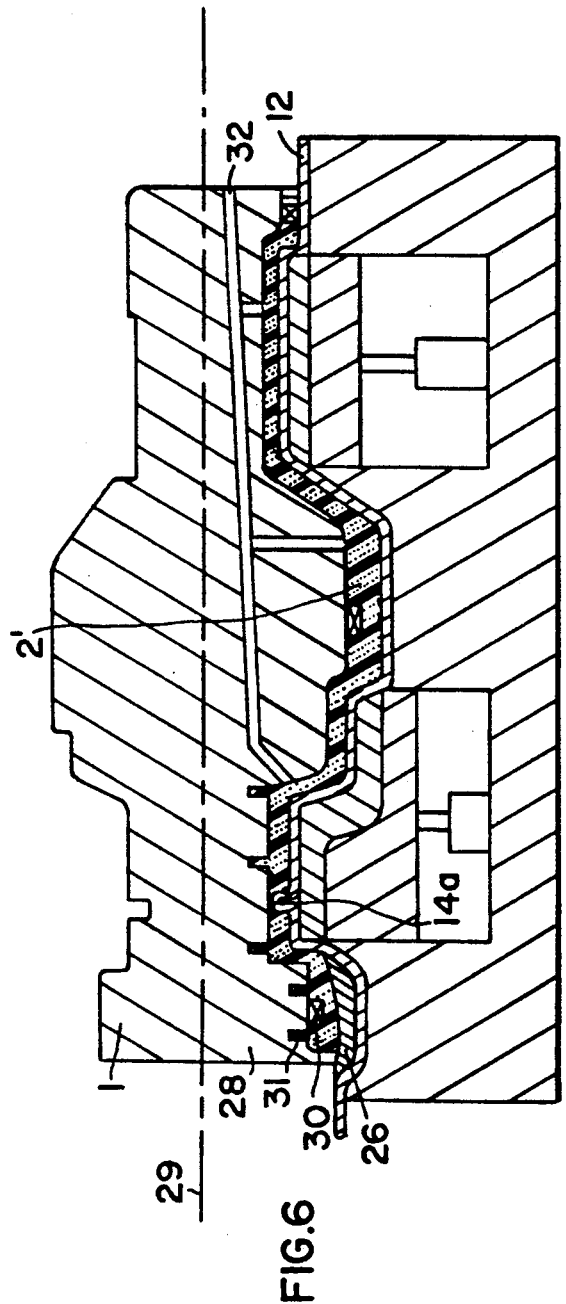
FIG.5
FIG.6

1

APPARATUS FOR MANUFACTURING TRIM PANELS INCLUDING SEVERAL TRIM COMPONENTS

CROSS-REFERENCE TO RELATED APPLICATION

This application is a Divisional Application of co-pending application Ser. No. 07/245,777, filed in the U. S. A. on Sept. 16, 1988, now U.S. Pat. No. 4,923,539, issue date: May 8, 1990.

FIELD OF THE INVENTION

The invention relates to an apparatus for manufacturing trim parts or panels, for example for an automobile interior. The present apparatus is especially suitable for manufacturing trim panels made of several trim components which may have different textures, patterns, or colors, or which may be made of different materials.

DESCRIPTION OF THE PRIOR ART

It is known in the art to manufacture trim panels, for example automobile door trim panels, of several different trim components or different trim materials which are to be applied to different areas of the trim panel. For example, a door panel typically is made of a relatively rigid substrate which is mostly covered by a vinyl film, but may also include areas covered by carpet or by textile. In order to manufacture such a trim panel in the past, a separate process step was carried out successively for each trim component or material, usually in separate work stations and often with manual work piece transfer between, and placement, in the various stations.

In a typical known method, first, carpet or textile pieces are glued in place on a preformed rigid substrate in areas which are to have a carpet or textile facing. Then a vinyl film is applied to the entire trim panel and glued to the substrate. In order to expose the carpet or textile areas, a heated welding stamp and cutting punch welds and punches the perimeter of the relevant areas, thereby weld-sealing and scoring cut-out edges in the vinyl film. The extraneous vinyl areas are then removed by tearing along the pre-scored perimeters. Rupturing of the weld seam and tearing of the remaining vinyl often occur during the tearing operation. Furthermore, these successive operations are labor intensive and relatively slow and hence all steps accumulate time.

In order to avoid some of the above mentioned problems, particularly the tearing problem, it has also become known to apply inserts of carpet or textile onto the trim panel after a continuous vinyl film covering has been applied. A trim insert, which may be a carpet piece, or a substrate carrying a foam core and a textile covering, is prefabricated in a separate operation. A vinyl film is applied, for example glued or otherwise bonded, to the door panel substrate. Then the preformed inserts are manually applied in the appropriate locations on top of the vinyl covering by gluing, screwing, or plastic stud riveting. These operations are also quite labor intensive, and the limited precision and repeatability of the manual steps may lead to misalignment of the trim components. Furthermore, the trim inserts often protrude above the vinyl covered surface, and do not provide a continuous flush surface. As mentioned above, the successive separate operations also limit the overall speed of production of the finished trim panels.

In order to avoid several work steps involved with prefabricating a substrate, it has also become known to form a vinyl film without a substrate, and then back-foam a foaming material onto the formed vinyl film in order to form a rigid foam substrate. Then surface trim inserts may be applied to the trim panel as described above.

OBJECTS OF THE INVENTION

In view of the foregoing it is the aim of the invention to achieve the following objects singly or in combination:

to improve on the above described methods of manufacturing multi-component trim panels, so as to provide a method which is simpler, faster, and hence less costly;

to apply and simultaneously form and laminate all trim components or separate materials to form an essentially finished trim panel in a single work operation;

to achieve a greater precision and repeatability of placement of trim components, and to provide a continuous flush surface of all trim components, if desired, in such a method;

to apply trim inserts onto the outside of a vinyl film cover layer and foam "soft-touch" inserts underneath the vinyl film cover layer, especially in the same forming work station;

to allow a great variability and exchangeability of trim materials and components and also in the contour and three-dimensional configuration of the trim panels;

to either provide a prefabricated rigid substrate onto which the trim materials are formed and laminated, or back-foam a rigid foam substrate into a formed or molded vinyl film;

to compress the edge rim of the vinyl film or other trim materials and to provide appropriate corner relief cutouts during the forming operation in order to allow simpler subsequent edge-folding; and to provide an apparatus for efficiently performing the present method.

SUMMARY OF THE INVENTION

The apparatus present invention is capable of simultaneously applying facing materials of a trim panel, e.g. a cover skin layer such as a vinyl film, and facing inserts of textile or carpet to a trim panel in a single operation in a single work station.

According to one embodiment of the invention, a preformed rigid substrate of plastic, wood, pressed fibers, steel, or rigid foam, etc. is held in a first form or mold of a forming station. Prefabricated insert components are securely placed in retracted "nest" dies of a second form or mold which has a shape essentially corresponding to the shape of the substrate. A cover skin layer such as a heated vinyl film is carried by a drop-frame between the substrate and the second form. Adhesive is applied between the substrate and the film, and between the inserts and the film. The adhesive is preferably a heat sensitive adhesive which is activated by the heated vinyl film. The adhesive may be provided in the form of an adhesive film. The drop-frame is moved toward the second form and a vacuum may be applied to preform the film into the second form or mold. The two forms or molds are clamped together, whereby the film is formed to the shape of and laminated to the substrate. The nest dies are extended to laminate the inserts onto the formed vinyl, in recessed areas of the vinyl so as to achieve a flush finished trim surface. While the form is closed during the adhesive curing time, a perimeter crimping rim and cutting knife are driven against counter tools to appropriately trim the panel edges and provide a compressed vinyl rim for easier subsequent edge-folding. Simultaneously, plastic welders or crimpers weld or crimp the ends of plastic rivet studs which may be provided on the inserts to extend through corresponding holes in the substrate, in order to securely attach the inserts to the substrate.

In addition to the facing inserts, such as carpet or textile inserts, which are placed in nest dies of the second form so as to be laminated to the outside of the vinyl film, "soft-touch" foam inserts may be fixed, e.g. glued, at appropriate locations on the substrate so as to be laminated underneath the vinyl film of the finished trim panel.

In another embodiment of the invention, a preformed substrate is not provided. Instead, two essentially mating forms or molds are used. The vinyl film is formed and the facing inserts and soft-touch inserts are laminated onto respective opposite sides of the vinyl film between the closed forms in one operation as described above. Additionally, so-called "doghouses", which will later receive clips for attaching the trim panel to the automobile body, may be placed on the backside of the vinyl film along with the soft-touch inserts. After the forming/laminating operation as described above is completed, a rigid foam substrate is back-foamed into the formed vinyl film. This may be carried out in the same work station by exchanging the first form or mold with a foaming form and either by "open-pouring" the foam material before closing the foaming form or by injecting the foam material into the closed form or mold through inlet ports or sprues and runners. Alternatively, the back-foaming may be carried out in an adjacent foaming station by shuttling the formed vinyl film in its form from the forming station to the foaming station.

In either embodiment, the finished trim panel is assembled or formed in essentially one operation, or an uninterrupted sequence of immediately subsequent steps performed in one or two neighboring stations. The facing inserts and soft-touch inserts are applied and attached or laminated with the vinyl film in one operation in the forming station. In the case of forming a rigid foam substrate by subsequent back-foaming into the formed vinyl film, the film acts as a foaming mold, thereby eliminating several steps involved with pre-forming a rigid substrate prior to the trim laminating operation. The facing inserts are securely held in fixed locations in nest dies provided in the form or mold, so that they cannot inadvertently slip or misalign before being laminated in place. The inserts may be manually placed into the nest dies. Hence, inserts of different colors or patterns or materials may be successively laminated in place by the same forming/laminating apparatus without requiring any retooling or stopping of a machine cycle.

BRIEF DESCRIPTION OF THE DRAWINGS

In order that the invention may be clearly understood, it will now be described, by way of example, with reference to the accompanying drawings, wherein:

FIG. 5 is a view of the arrangement of FIG. 4, but after the top and bottom forms have closed to form the vinyl film and laminate the trim inserts;

FIG. 6 is a sectional view of a foaming form as an integral component of the top form, with the foaming form in place for back-foaming a substrate onto the vinyl film;

DETAILED DESCRIPTION OF PREFERRED EXAMPLE EMBODIMENTS AND OF THE BEST MODE OF THE INVENTION

Figure 1:
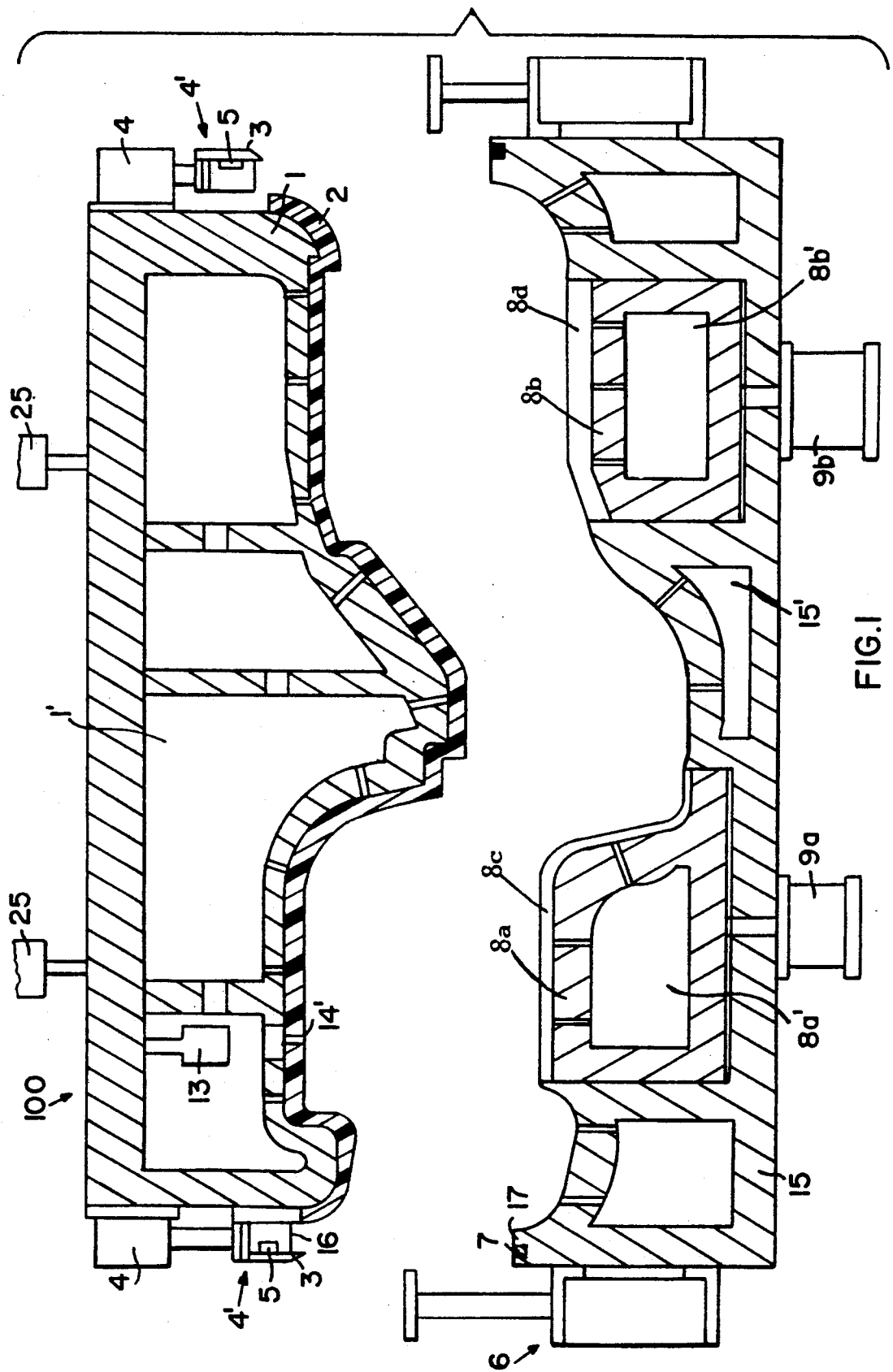
FIG. 1 is a side view in partial section of an apparatus for manufacturing an automobile door trim panel according to the method of the invention.

As shown in FIG. 1, the preferred embodiment of the apparatus for carrying out the method of the invention comprises essentially a forming station 100 including an upper or top form or mold section 1 and a lower or bottom form or mold section 15. The upper form 1 is, for example, movably held and driven by force applying elements 25 such as piston cylinder devices, while the lower form 15 is stationarily attached to a machine frame or bed. Vacuum chamber 1' and 15' may be provided in the forms or mold sections 1 and 15 respectively, along with appropriate vacuum ducts for applying a vacuum to the molding surfaces. In a first embodiment, a rigid door panel substrate 2 is held on the upper form 1, for example by a vacuum applied through the vacuum chamber 1'. The substrate 2 has been preformed of plastic, wood, pressed fibrous material, steel, or rigid foam, in a separate conventional operation.

Around its perimeter, the upper form 1 carries force applying elements 4 such as piston cylinder devices or preferably so-called linear pneumatic drives manufactured by Stanztechnik GmbH R+S of Frankfurt, West Germany. The force applying elements 4 carry and drive stamping elements 4' also arranged continuously or at appropriate locations around the form perimeter. A stamping element 4' includes a cutting knife 3, a heater 5, and a crimping edge or surface 16. Around its perimeter, the lower form 15 includes a stamp cutting counter surface 7 and a crimping counter surface 17, which respectively counter the cutting knife 3 and the crimping surface 16 during the stamping operation as described below. The upper form 1 may further carry a stud welder or riveting unit 13, which will rivet plastic studs of a trim insert which protrude through holes 14' in the substrate 2.

Figure 2:
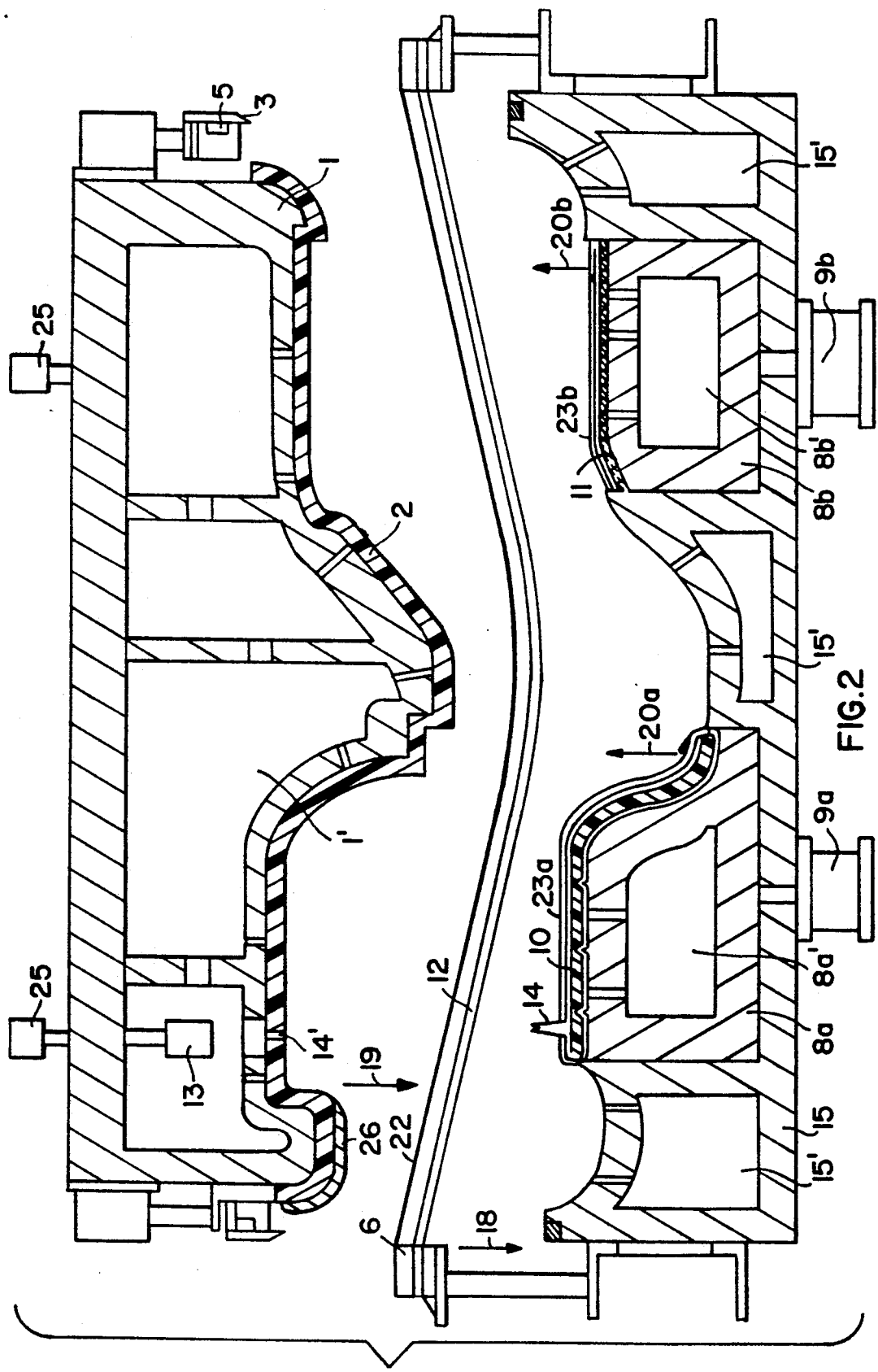
FIG. 2 is a view similar to that of FIG. 1, but with a vinyl cover film and trim inserts in place.
Figure 3:
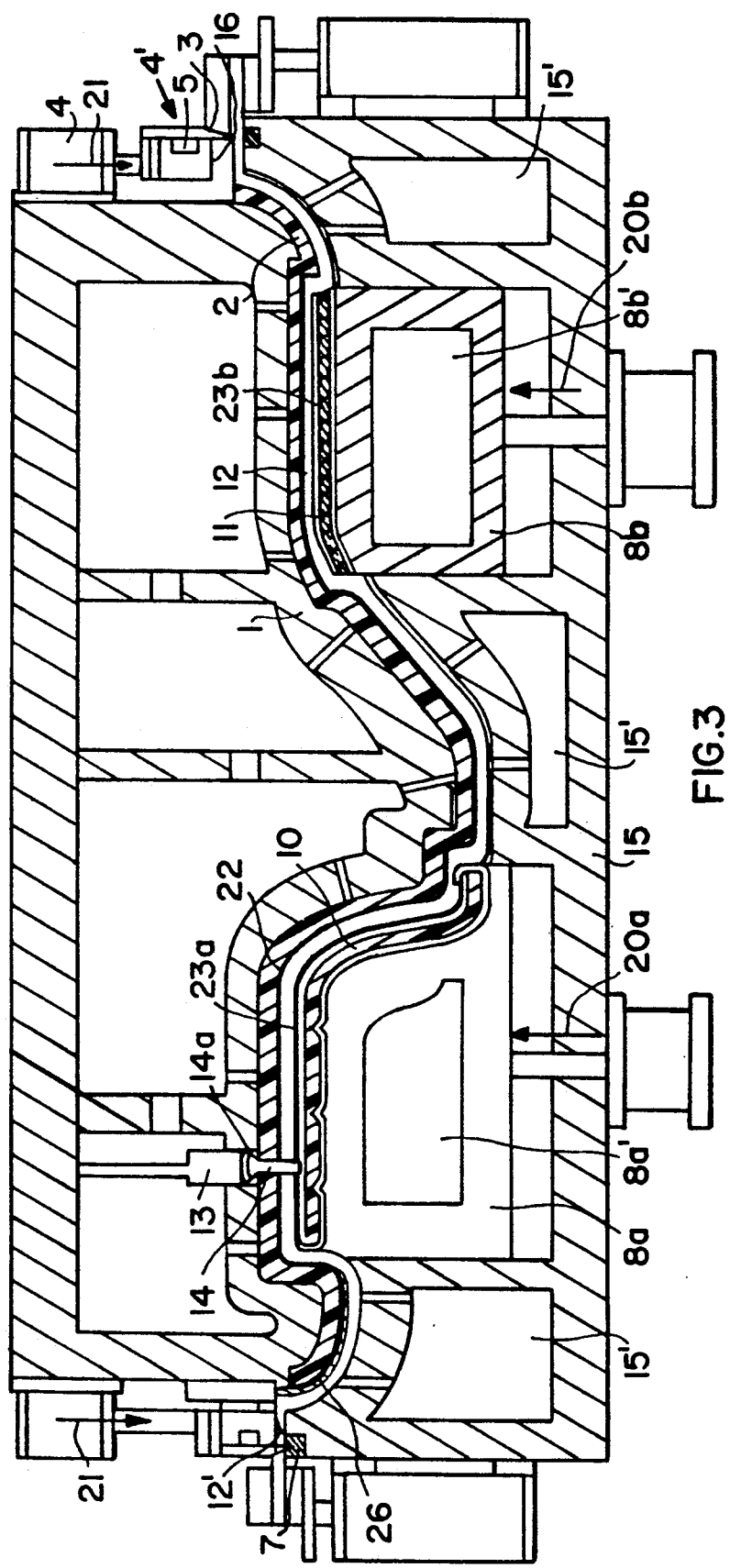
FIG. 3 is a view similar to that of FIG. 2, but after the top and bottom forms have closed to form or mold, laminate, and stamp cut the trim panel.
Figure 4:
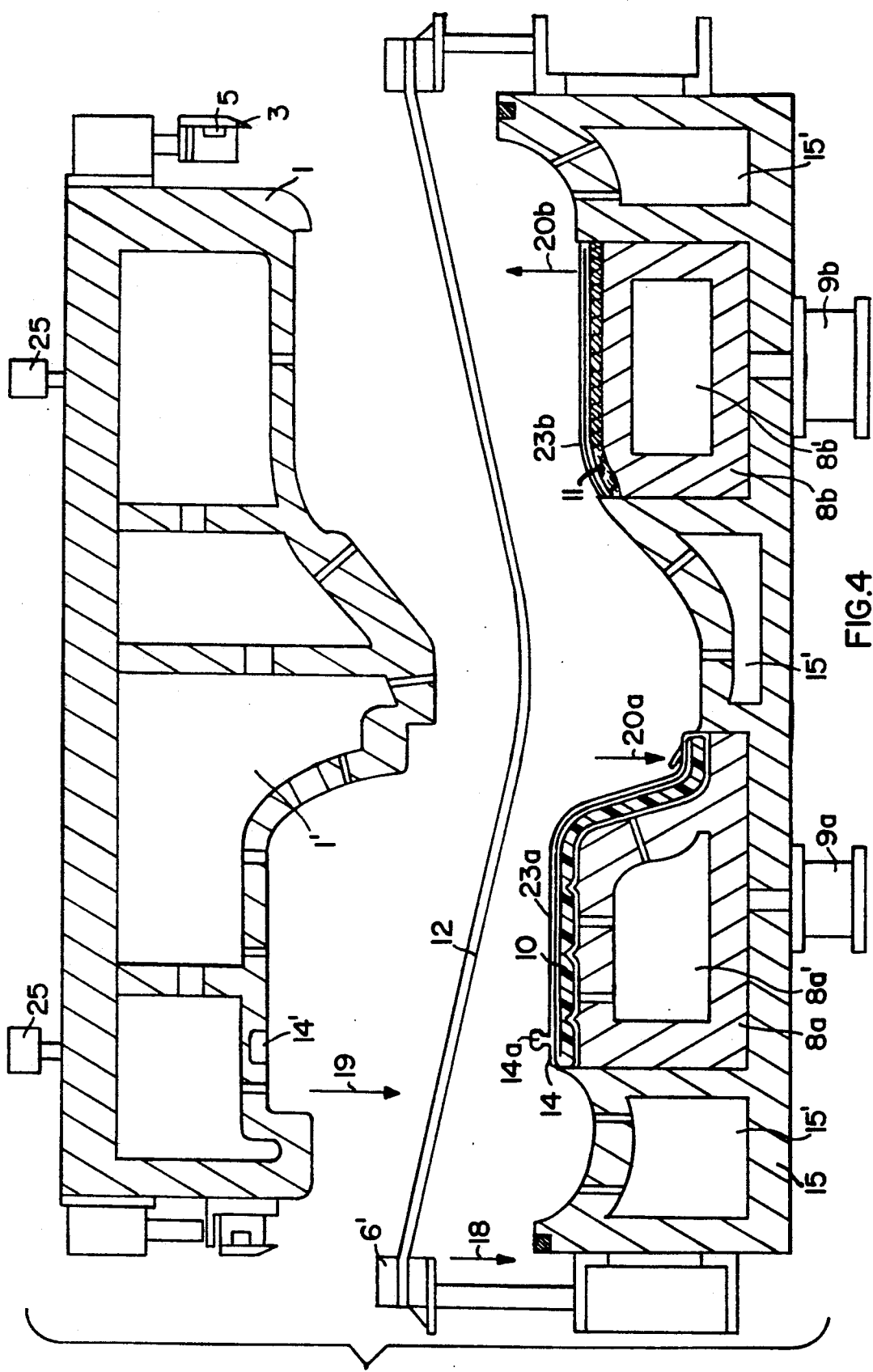
FIG. 4 is a view similar to that of FIG. 2, but of an alternative embodiment not initially providing a panel substrate.

The lower form has recesses or cut-out areas corresponding to the shape and location of trim inserts which are to be affixed to the door panel. These recesses form nesting cavities 8c and 8d nesting. Nest dies 8a and 8b are arranged in these cut-out areas, or nesting cavities 8c, 8d. The nesting dies 8a and 8b and may be provided with vacuum chambers 8a' and 8b' respectively, for applying a vacuum to the die surfaces. Similarly, vacuum chambers 15' may apply vacuum to the surface of the lower form 15 if desired. Force elements 9a and 9b, which may be piston cylinder devices for example secured to the lower mold 15, are arranged to drive the nesting dies 8a and 8b respectively. In their retracted positions as shown, the surfaces of nesting dies 8a and 8b lie below the surface of the lower mold section 15, so that said nesting cavities 8c and 8d are formed for receiving trim inserts. Because of this nesting feature of the invention, the inserts cannot be improperly positioned, and once they are placed in the nesting cavities, they cannot slip laterally out of place since the surface of the nesting die is initially recessed relative to the surface of the lower mold section 15 as best seen in FIGS. 1, 2, and 4. However, in their extended positions as shown in FIG. 3, the nesting dies 8a and 8b form a flush continuous surface with the surface of the lower to the independent movability of the nesting dies 8a, 8b by their drive elements 9a and 9b, the nesting cavities 8c, 8d have a movable bottom. Thus, inserts will be laminated in place to form a flush finished trim surface as described below because the inserts cannot escape laterally during the mold closing.

A material feed unit 6 for supplying a cover skin layer, for example a vinyl film, and an adhesive film, is arranged on at least one side of the lower form 15. The material feed unit 6 includes a heater for heating the vinyl film, a film storage roll and film transport rollers, as well as a drop-frame 6' for carrying a film sheet 12 into the forming station 100, and force applying elements for moving the drop-frame laterally and vertically. The specific components of the feed unit 6 as such are conventional and hence will not be explained in detail.

As shown in FIG. 2, a heated cover skin layer, for example a vinyl film 12, has been carried by a dropframe 6' into the space between the upper form 1 and the lower form 15 in the arrangement described with reference to FIG. 1. A textile trim insert 10 has been placed on the nest die 8a. The textile insert 10 has been prefabricated in a separate operation, and may be a thin textile piece or a three-dimensional plastic substrate covered by foam padding and textile. A carpet insert 11 has been placed on the nest die 8b. The insert 11 is, for example, a pre-cut carpet piece. The manufacture of the inserts 10 and 11 is not directly related to the present invention, and may be carried out in any manner known in the art. The inserts may include plastic rivet studs 14, as shown on the textile insert 10. The studs 14 will protrude through corresponding holes 14' in the substrate 2 when the trim materials are laminated together. Then the ends of the studs 14 may be crimped or riveted by a riveter 13 to securely attach the inserts 10 or 11 to the substrate 2. Furthermore, soft foam "soft-touch" inserts 26 are applied, e.g. glued, to appropriate areas of the rigid substrate 2, in order to be laminated under the cover layer 12 in the following operation.

An adhesive, for example in the form of a heat-sensitive film 22 shown in FIG. 2, is applied between the substrate 2 and the hot vinyl film 12. Adhesive 23a and 23b is also applied between the respective inserts 10, 11 and the vinyl film 12. This adhesive is also preferably a heat sensitive adhesive, and may be applied as an adhesive film, or by brushing, spraying, or rolling a liquid adhesive as is commonly known.

Once the trim components are in place as described, the drop-frame 6' is lowered as shown by arrow 18. A vacuum may be applied to the vacuum chambers 15' in order to partially preform the vinyl film to the shape of the lower form 15. Vacuum applied to the vacuum chambers 8a' and 8b' assists in holding the inserts 10 and 11 in place, but additionally, they remain securely "nested" in the nesting dies 8a and 8b. Then the upper form 1 carrying the substrate 2 is lowered by the piston cylinder devices 25, as shown by the arrow 19. It should be noted that the upper form 1 may move vertically downwardly or may tilt downwardly about a hinge connection with the lower form or mold 15.

After the form closes, i.e. the substrate 2 is pressed firmly into form-fitting contact with the vinyl film 12 against the lower form or mold 15, the force elements 9a and 9b drive the nest dies 8a and 8b upward as shown by arrows 20a and 20b respectively. Because the substrate 2 is already tightly fitted to the lower form 15, the inserts 10 and 11 cannot slip laterally even when they are pressed out of the "nests" previously formed by the dies 8a and 8b. While the description above indicates that the movements represented by the arrows 18, 19, and 20a, 20b occur in sequence, they may actually occur essentially simultaneously, or in a different sequential order than that described.

As shown in FIG. 3, the forms or molds 1 and 15 are clamped closed and the dies 8a and 8b are pressed upwardly with a sufficient pressure and duration so that the heat sensitive adhesive 22, 23a, 23b is activated by the hot vinyl film 12 and effectively bonds and laminates the several layers together. The form remains clamped closed for a time sufficient to allow the adhesive to cure.

While the form is closed, the force applying elements 4 are activated to drive the stamping elements 4' downwardly as shown by arrow 21, whereby the outer contour of the vinyl film 12 is cut by the knife 3 stamping against the counter surface 7, and a perimeter rim 12' is compressed by the crimping surface 16 pressing against the counter surface 17, whereby the compressed rim 12' will facilitate subsequent edge-folding. Both the cutting and the rim compressing are simplified if the cutting knife 3 and crimping surface 16 are heated by the heater 5.

The stud riveter 13 is also activated while the form is clamped closed. Plastic rivet studs 14, for example of the insert 10, have pierced through the vinyl film 12 and extended through holes 14' of the substrate 2 during the form closing operation. The rivet stud ends are now crimped or riveted by the riveter 13 to form, for example mushroom shaped, rivet heads 14a. The rivet heads 14a in addition to the adhesive 23a, provide a very secure attachment of the insert 10 to the substrate 2.

After the appropriate curing time for the adhesive 22, 23a, 23b has elapsed, the vacuum in the vacuum chambers 1' and then 15' as well as 8a' and 8b' is interrupted, the upper form 1 is lifted, and the door trim panel may be removed from the lower form 15. The forming station is now ready for another forming cycle. In this manner, the vinyl film 12 is formed and laminated to the substrate 2, and the inserts 10 and 11 as well as 26 are attached or laminated in place in one work operation. Furthermore, a compressed or crimped vinyl rim 12' has been formed, and includes appropriate corner relief cut-outs to facilitate the subsequent edge-folding operation.

In another embodiment of the invention, as shown in FIG. 4, the upper form or mold 1 is directly a molding form, that is to say, no substrate 2 is provided as described above. The lower form 15 and its auxiliary components remain as described above, and a drop-frame 6' carries a heated sheet of vinyl film 12 between the upper form 1 and the lower form 15. Trim inserts 10 and 11 are placed in retracted nest dies 8a and 8b respectively, and adhesive 23a and 23b is applied between the respective insert 10, 11 and the vinyl film 12. The inserts 10 or 11 may include rivet studs 14 with preformed mushroom heads 14a which fit into corresponding holes or recesses 14' of the upper form 1. The mushroom rivet heads 14a must not puncture the vinyl film 12, but rather the film 12 is to be molded around the rivet heads 14a. The vinyl film 12 is lowered toward the bottom form 15 as shown by arrow 18, the upper form closes downwardly as indicated by arrow 19, and the nest dies 8a and 8b extend upwardly as indicated by the arrows 20a, 20b. Vacuum may be applied to chambers 1', 15', 8a', and 8b'.

As shown in FIG. 5, when the form is closed, the vinyl film 12 is formed or molded, and inserts 10 and 11 are laminated onto it, much as described above for FIG. 3. The film 12 is formed around the rivet heads 14a. Then the perimeter contour of the film 12 is stamp cut, and a crimped rim 12' is formed in an analogous manner as described above. After the adhesive cures sufficiently, vacuum is interrupted in the vacuum chamber 1' and the upper form 1 is opened, while vacuum is maintained in the chambers 15', 8a', and 8b' to maintain the position and form of the formed vinyl film 12.

As shown in FIG. 6, the upper form 1 may be an integral component of a foaming form or mold 28, so that the present forming station is also a foaming station, whereby the trim panel need not be transported to a separate foaming station. The upper form 1 rotates about a horizontal axis 29 to position the foaming form 28 over the formed vinyl 12 held in the lower form 15. A "soft-touch" soft foam insert 26 has been inserted and glued in place at an appropriate location on the backside of the formed vinyl film 12. So-called "doghouses" 30 for clipping the finished trim panel to the automobile body are inserted to be carried by the foaming form 28. Thereupon, the foaming form 28 is driven downwardly to close the lower form 15 shown in its closed position in FIG. 6. The foaming form 28 includes appropriate channels 31 for forming strengthening ribs and the like. Foam material, which is, for example glass fiber filled, may be poured onto the formed vinyl film 12 while the foaming form 28 is still open, or may be injected into the closed form through sprues 32. While the form is clamped closed, the foam material cures to form a rigid foam backing or substrate 2' for the vinyl film 12. The rigid foam 2' tightly bonds to the film 12, and engagingly surrounds the rivet heads 14a and the doghouses 30.

After the foam has cured, the foaming form 28 is opened, vacuum is discontinued at the chambers of the lower form 15, and the essentially finished trim panel may be removed and subsequently edge-folded in a final step. In this manner, similarly as in the embodiment described above, a vinyl film 12 is formed, trim inserts 10, 11 are laminated onto it, soft-touch inserts 26 are laminated underneath it, and it is laminated onto a rigid substrate 2', all in essentially one work operation and in one work station. This second embodiment eliminates several steps associated with prefabricating a rigid substrate 2, because the formed vinyl 12 inherently has the proper mold shape for the subsequent back-foaming process. The necessity of providing a separate adhesive 22 between the film 12 and the substrate 2 is also eliminated.

Alternatively, the back-foaming could take place in a separate foaming station, in which case the formed vinyl 12 with the inserts 10 and 11 laminated onto it, would be shuttled to the foaming station vacuumed to the lower form 15. As a further alternative, the lower form 15 would remain stationary, but a separate foaming form would be moved into place as the upper form 1 is moved away.

Figure 7:
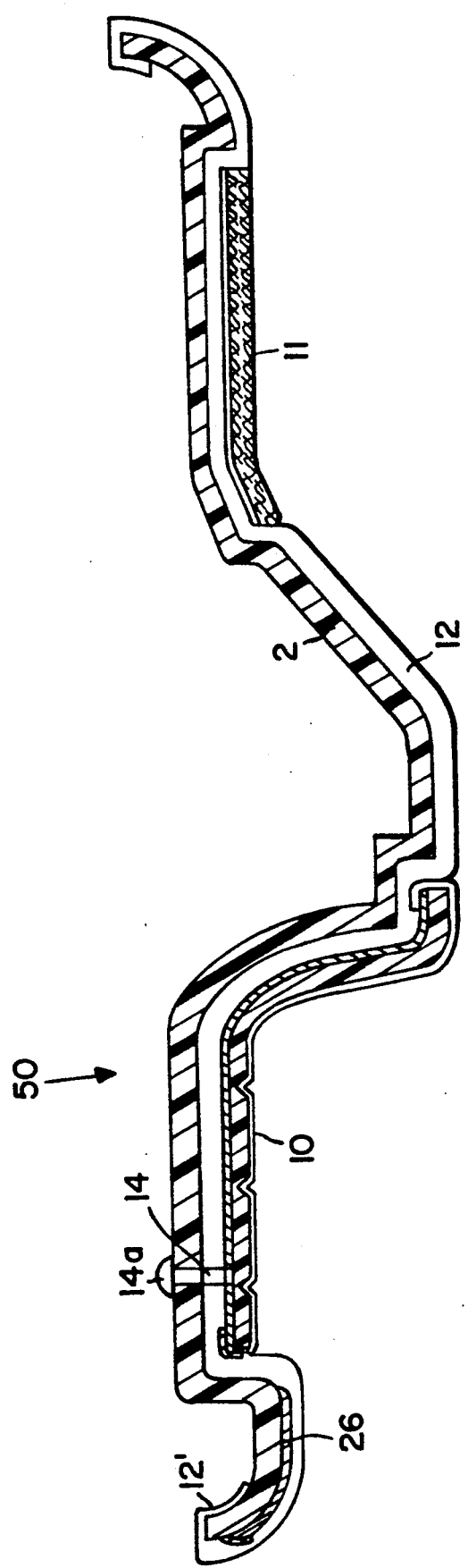
FIG. 7 is a sectional view of a finished door trim panel produced according to the invention, after the vinyl edge rim has been edge-folded.
Figure 8:
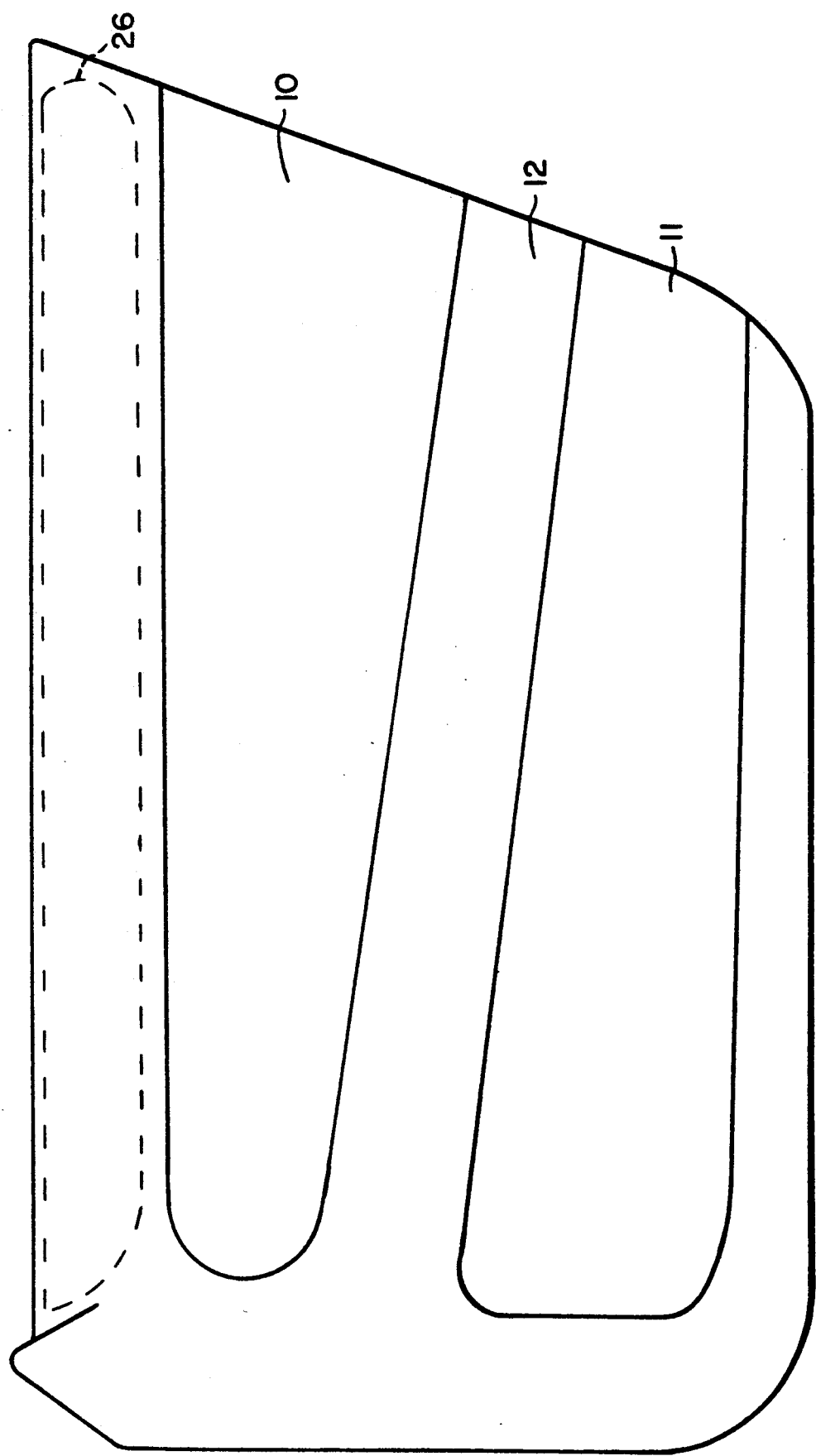
FIG. 8 is a front area view of the trim panel of FIG. 7.

A door trim panel 50 as produced according to the first method embodiment of the invention is shown in section in FIG. 7. A door trim panel produced according to the second embodiment is quite similar to that shown. However, for the second embodiment, the rivet heads 14a would not be exposed on the back surface of the substrate 2, but rather would be lodged in the rigid foam substrate 2'. Furthermore, "doghouses" 30 could be provided as described above. As is shown, the trim inserts 10 and 11 form an essentially flush trim surface with the surrounding areas of the vinyl film 12. As provided according to the invention, the perimeter of the vinyl film 12 is a crimped or compressed flange or rim 12' which may be easily edge-folded in a separate operation, which may be performed as is typically known. The finished door trim panel, after the rim 12' has been edge-folded, is shown in a sectional view in FIG. 7 and in a front view in FIG. 8.

Although the invention has been described with reference to specific example embodiments, it will be appreciated, that it is intended to cover all modifications and equivalents within the scope of the appended claims.

What we claim is:

1. An apparatus for manufacturing trim panels in a mold, said trim panels having at least one trim insert as part of a finished trim panel, comprising a first mold section (15) having a first mold surface facing up and a second mold section (1) above said first mold section, said second mold section having a second mold surface facing down, said first and second mold sections being arranged movable relative to each other to open and close said mold, at least one nesting cavity (8c, 8d) in said first mold section for receiving said trim insert, nesting die means (8a, 8b) movable in said nesting cavity (8c, 8d) relative to said first mold section so that a surface of said nesting die means is withdrawn relative to said first mold surface of said first mold section to form said nesting cavity for holding said trim insert, and drive means (9a, 9b) connected to said nesting die means for moving said nesting die means independently of said first mold section in said nesting cavity, said surface of said nesting die means forming a movable bottom of said nesting cavity for determining a depth of said nesting cavity depending on a position of said nesting die means in said nesting cavity as controlled by said drive means, whereby said depth of said nesting cavity is adjustable by said drive means for holding inserts of different thicknesses in said nesting cavity against a horizontal and vertical displacement when said first and second mold sections are being closed.

2. The apparatus of claim 1, wherein said drive means for said nesting die means comprise piston cylinder means (9a, 9b) secured to said first mold section, said drive means having a piston rod passing through said first mold section for driving the respective nesting die means independently of said first mold section.

3. An apparatus for manufacturing trim panels including at least one trim insert, comprising a lower mold and an upper mold, at least one nesting die for forming a nesting cavity in said lower mold for receiving a trim insert, a drop-frame for carrying a cover skin layer between said lower mold and said upper mold, first force applying means for driving one of said lower and upper molds relative to each other into open and closed positions, second force applying means for driving said nesting die relative to said lower mold into retracted and extended positions, third force applying means for driving said drop-frame relative to said lower mold, heating means for heating said cover skin layer carried by said drop-frame, a cutting knife, a crimping member, counter surface means arranged on said lower mold for countering said cutting knife and for cooperation with said crimping member, and fourth force applying means for driving said cutting knife relative to said counter surface means.

4. The apparatus of claim 3, further comprising first vacuum chambers and vacuum ducts arrange din said lower mold for applying a vacuum to a surface of said lower mold, second vacuum chambers and vacuum ducts arranged in said upper mold for applying a vacuum to a surface of said upper mold to at least partially vacuum form said cover skin layer, and third vacuum chambers and vacuum ducts arranged in said nesting die for applying a vacuum to a surface of said nesting die to hold said trim insert.

5. The apparatus of claim 3, wherein said upper mold carries a prefabricated rigid trim panel substrate.

6. The apparatus of claim 3, further comprising foaming means, cooperating with said upper mold and with said lower mold for molding said cover skin layer, and for back-foaming a curable rigid foam trim panel substrate onto said cover skin layer.

7. The apparatus of claim 6, wherein said upper mold and said foaming means together form an integral mold member.

8. The apparatus of claim 3, further comprising riveting means for forming a rivet head on at least one rivet stud of said trim insert.

* * * * *